(12) United States Patent
Chang

(10) Patent No.: US 8,254,028 B2
(45) Date of Patent: Aug. 28, 2012

(54) DIFFRACTION GRATING STRUCTURE AND METHOD FOR MANUFACTURING SAME

(75) Inventor: Jen-Tsorng Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 941 days.

(21) Appl. No.: 12/192,031

(22) Filed: Aug. 14, 2008

(65) Prior Publication Data

US 2009/0116110 A1 May 7, 2009

(30) Foreign Application Priority Data

Nov. 5, 2007 (CN) .......................... 2007 1 0202379

(51) Int. Cl.
*G02B 5/18* (2006.01)
(52) U.S. Cl. ....................................... 359/569
(58) Field of Classification Search ................... 359/569
See application file for complete search history.

(56) References Cited

U.S. PATENT DOCUMENTS

| 4,012,843 A | 3/1977 | Harada et al. |
| 5,029,154 A * | 7/1991 | Sumi et al. ................. 369/44.23 |
| 5,258,871 A * | 11/1993 | Gupta ...................... 359/489.06 |

* cited by examiner

*Primary Examiner* — Alessandro Amari
(74) *Attorney, Agent, or Firm* — Altis Law Group, Inc.

(57) ABSTRACT

A diffraction grating structure comprises a substrate having a first surface and a second surface opposite to the first surface. A first grating is defined on the first surface and a second grating is defined on the second surface. The first grating includes a plurality of first grooves and has a first grating period. The second grating includes a plurality of second grooves and has a second grating period. The first groove and the second groove are formed by a fast tool servo system.

5 Claims, 1 Drawing Sheet

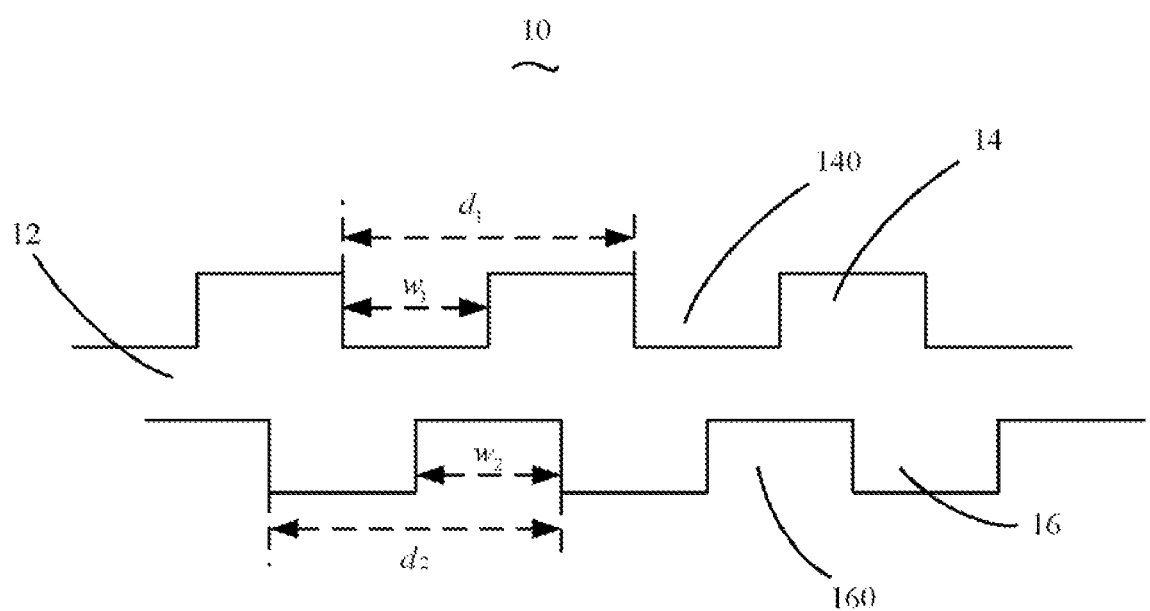

DIFFRACTION GRATING STRUCTURE AND METHOD FOR MANUFACTURING SAME

BACKGROUND

1. Technical Field

The present invention generally relates to optical diffraction elements, particularly, to a diffraction grating structure and a method for manufacturing the same.

2. Discussion of Related Art

Diffraction gratings are widely used in technology. In particular, the diffraction gratings serve as dispersive elements for spectrum analyzers and are also often used in laser devices serving to select, tune, and expand the light spectrums of the laser devices. In integrated optics and light communication, a diffraction grating is an advantageous optical-coupling element.

Currently, diffraction gratings are manufactured by one of two methods. The first method is using ruling engines. Diffraction gratings manufactured with a ruling engine are called mechanically ruled gratings. Grooves of the mechanical ruled grating have different characteristics because of ability of the ruling engines. Some various stray lines produced in a photographic side of the grating can effect application of the grating in high impact spectrometers. Using ruling to manufacture the ruled grating is costly, requiring a lot of time and strict control of the production environment, so that application of the mechanical ruled grating is limited.

The second method involves laser technology. Diffraction gratings made this way are called holographic gratings and have sinusoidal grooves. For holographic gratings, lasers are used on a substrate to etch film coated thereon, to form a regular pattern of grooves, and the grooves may then be bombarded with an ion beam to produce a blazed grating and to enhance grating diffraction efficiency.

The diffraction gratings manufactured by the above two methods are usually a single surface structure. Light beams passing through the gratings cannot be converted from a low spatial frequency to a high spatial frequency.

What is needed, therefore, is a diffraction grating structure configured for modulating a low spatial frequency light into a high spatial frequency light and a method for manufacturing the same.

SUMMARY

A diffraction grating structure comprises a substrate having a first surface and a second surface opposite to the first surface. A first grating is defined on the first surface and a second grating is defined on the second surface. The first grating includes a plurality of first grooves and has a first grating period. The second grating includes a plurality of second grooves and has a second grating period.

BRIEF DESCRIPTION OF THE DRAWINGS

Many aspects of the present diffraction grating structure and method for manufacturing same can be better understood with reference to the following drawing. The components in the drawing are not necessarily drawn to scale, the emphasis instead being placed upon clearly illustrating the principles of the present diffraction grating and method for manufacturing the same. Moreover, in the drawing, like reference numerals designate corresponding parts throughout the several views.

The drawing is a schematic view of a diffraction grating structure in accordance with a present embodiment.

DETAILED DESCRIPTION OF THE EMBODIMENT

The preferred embodiments of the present invention will now be described with reference to the attached drawing.

Referring to FIG. 1, a diffraction grating structure 10 includes a substrate 12, a first grating 14, and a second grating 16.

A period (or cycle) of the first grating 14 is labeled $d_1$, and the first grating 14 includes a plurality of first grooves 140 and has a width $w_1$. A period of the second grating 16 is labeled $d_2$, and the second grating 16 includes a plurality of second grooves 160 and has a width $w_2$.

When, value of $d_1$ is not equal to that of $d_2$, the difference value between $w_1$ and $w_2$ is less than 5 micrometers.

When, value of $d_1$ is equal to that of $d_2$, value of $w_1$ is equal to, or less than, or larger than that of $w_2$.

When value of $d_1$ is equal to that of $d_2$, the beginning of each of the first grooves 140 is misaligned with that of each of the second grooves 160.

Alternatively, when value of $d_1$ is equal to that of $d_2$, the first groove 140 aligns with the second groove 160. That is the beginning of each of the first grooves 140 is aligned with that of the second groove 160.

The profile of the first groove 14 of the first grating 14 can be described by the following function $f_1(x)$ which has a period $d_1$.

$$y = f_1(x) = tg\theta \cdot x$$
$$\left(-\frac{d_1}{2} \le x \le \frac{d_1}{2}\right)$$

$f_1(x)$ is an odd function, so $f_1(x)$ can be expanded in Fourier sinusoidal series as following:

$$f_1(x) = \sum_{n=1}^{\infty} b_n \cdot \sin\frac{2n\pi x}{d_1}$$

$$\left(b_n = \frac{4}{d_1}\int_0^{\frac{d_1}{2}} tg\theta \cdot x \cdot \sin\frac{2n\pi x}{d_1} d_1 x = (-1)^{n-1}\frac{d_1 \cdot tg\theta}{n\pi}x\right)$$

Thus, $f_1(x)$ is described as an expression (1).

$$f_1(x) = \frac{d_1 tg\theta}{\pi}\left[\sin\frac{2\pi x}{d_1} - \frac{1}{2}\sin\frac{4\pi x}{d_1} + \frac{1}{3}\sin\frac{6\pi x}{d_1} - \frac{1}{4}\sin\frac{4\pi x}{d_1} + \ldots\right] \quad (1)$$

More series are taken, the synthetic curve is more closer to $f_1(x)$. In an aspect of manufacturing, appropriate series are achieved to meet requirement of precision. To find optimal solution, amplitude or phase of $f_1(x)$ can be modified. In the present embodiment, the first three series are taken, so $f_1(x)$ is described as function (2).

$$f_1(x) = \frac{d_1 tg\theta}{\pi}\left[\sin\frac{2\pi x}{d_1} - \frac{1}{2}\sin\frac{4\pi x}{d_1} + \frac{1}{3}\sin\frac{6\pi x}{d_1}\right] \quad (2)$$

As same, the profile of the second grating 16 is described by $f_2(x)$ which is read as function (3). In the present embodiment, $f_2(x)$ is taken the first three series, so $f_2(x)$ is also described as function (4).

$$f_2(x) = \frac{d_2 tg\theta}{\pi}\left[\sin\frac{2\pi x}{d_2} - \frac{1}{2}\sin\frac{4\pi x}{d_2} + \frac{1}{3}\sin\frac{6\pi x}{d_2} - \frac{1}{4}\sin\frac{4\pi x}{d_2} + ...\right] \quad (3)$$

$$f_2(x) = \frac{d_2 tg\theta}{\pi}\left[\sin\frac{2\pi x}{d_2} - \frac{1}{2}\sin\frac{4\pi x}{d_2} + \frac{1}{3}\sin\frac{6\pi x}{d_2}\right] \quad (4)$$

From knowledge of the light interference, that is known value of $d_1$ is described as $$\frac{\lambda_1}{2n_1\sin\alpha_1},$$

wherein, $\lambda_1$ is wavelength, $\alpha_1$ is a half of angle of two coherent beams, and $n_1$ is a diffraction index. Thus, spatial frequency labeled $f_1$ of the first grating 14 is equal to $$\frac{1}{d_1}.$$

In condition of air, $n_1$ is equal to 1, then, $d_1$ is equal to $$\frac{\lambda_1}{2\sin\alpha_1}.$$

Same as the first grating 14, in the condition of air, value of $d_2$ of the second grating 16 is described as $$\frac{\lambda_2}{2n_2\sin\alpha_2},$$

wherein, $\lambda_2$ is wavelength, $\alpha_2$ is a half of angle of two coherent beams, and $n_2$ is a diffraction index. Thus, spatial frequency labeled $f_2$ of the second grating 16 is equal to $$\frac{1}{d_2}.$$

In operation, when a light beam having frequency of f passes through the first grating 14 and shines on the second grating 16, the light beam is firstly modulated by the first grating 14 and has a frequency of $f+f_1$, and then, the modulated light beam is modulated by the second grating 16 and has a frequency of $f+f_1+f_2$. Thereof, the light beam is modulated and has a high spatial frequency $f+f_1+f_2$.

During manufacturing of the diffraction grating 10, a fast tool servo system (shorten in FTS system) is used to machine the first grating 14 and the second grating 16.

$f_1(x)$ is input into the FTS system, then the FTS system is instructed by $f_1(x)$ and to machine the first grating 14 on the first surface of the substrate 10. After finishing the first grating 14, $f_2(x)$ is input into the FTS system, then the FTS system is instructed by $f_2(x)$ and to machine the second grating 16 on the second surface of the substrate 10. Using the FTS system to form the first grating 14 and the second grating 16, an optical photoresist film is omitted, thus, this method achieves a low cost.

If the first groove 140 is offset from second groove 160, during manufacturing of the second grating 16, the tool of the FTS system is firstly controlled to machine the difference value $d_1-d_2$, and then to controlled to machine the second grating 16 according to $f_2(x)$.

Alternatively, a Ni alloy film can be coated on two surfaces of the substrate 10, and then the first grating 14 and the second grating 16 are formed on the substrate 10.

In conclusion, the diffraction grating structure 10 of the present embodiment utilizes two grating structures to modulate a low spatial frequency light into a high spatial frequency light. Therefore, it is favorable to apply such diffraction grating to high spatial frequency needed environment to increase efficiency.

It is to be understood that the above-described embodiment is intended to illustrate rather than limit the invention. Variations may be made to the embodiment without departing from the spirit of the invention as claimed. The above-described embodiments are intended to illustrate the scope of the invention and not restrict the scope of the invention.

What is claimed is:

1. A diffraction grating structure comprising: a substrate having a first surface and a second surface opposite to the first surface, wherein a first grating is defined on the first surface and a second grating is defined on the second surface, the first grating includes a plurality of first grooves and has a first grating period $d_1$, and the second grating includes a plurality of second grooves and has a second grating period $d_2$, and wherein the profile of the first grooves of the first grating are described by the following function:

$$f_1(x_1) = \frac{d_1\tan\theta}{\pi}\left[\sin\frac{2\pi x_1}{d_1} - \frac{1}{2}\sin\frac{4\pi x_1}{d_1} + \frac{1}{3}\sin\frac{6\pi x_1}{d_1}\right],$$

and the profile of the second grooves of the second grating are described by the following function:

$$f_2(x_2) = \frac{d_2\tan\theta}{\pi}\left[\sin\frac{2\pi x_2}{d_2} - \frac{1}{2}\sin\frac{4\pi x_2}{d_2} + \frac{1}{3}\sin\frac{6\pi x_2}{d_2}\right],$$

where $\theta$ is a half of angle of two coherent beams radiating on the diffraction grating structure, $\tan\theta$ represents the tangent of the angle $\theta$, x1 is a longitudinal coordinate which has an origin at the centre of the first grating, and x2 is another longitudinal coordinate which has another origin at the centre of the second grating.

2. The diffraction grating structure as claimed in claim 1, wherein the first grating period is equal to the second grating period.

3. The diffraction grating structure as claimed in claim 2, wherein the first grooves are misaligned with the second grooves.

4. The diffraction grating structure as claimed in claim 2, wherein the first grooves are aligned with the second grooves.

5. The diffraction grating structure as claimed in claim 1, wherein the first grating period is less than the second grating period.

* * * * *